2,107,503

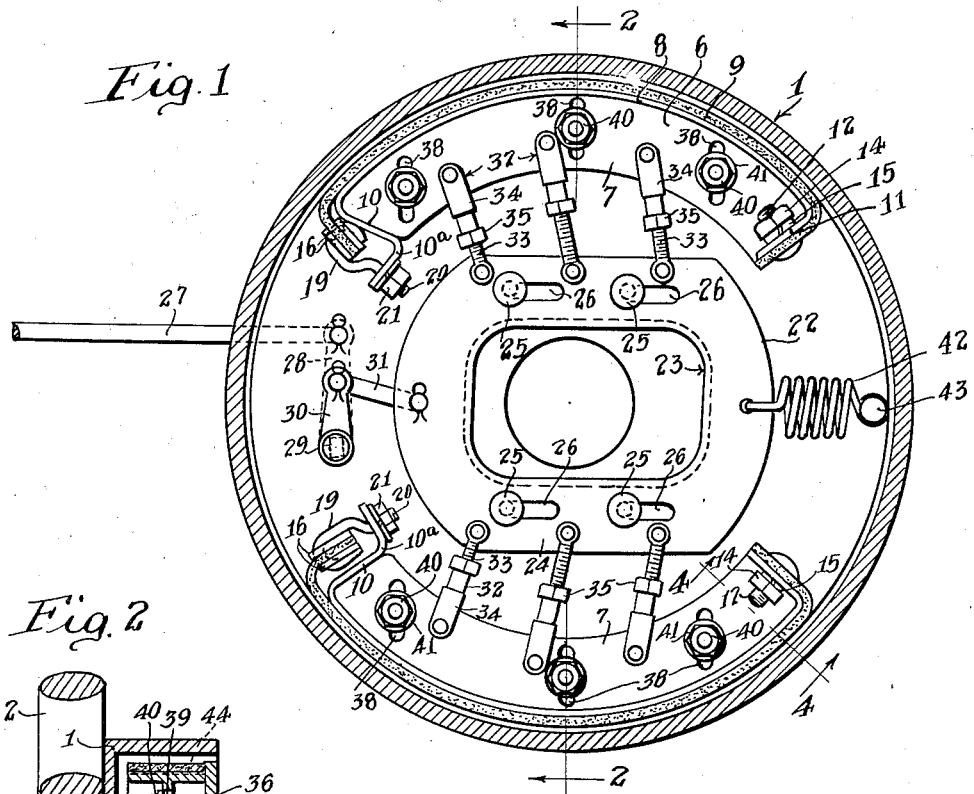
Fig. 1
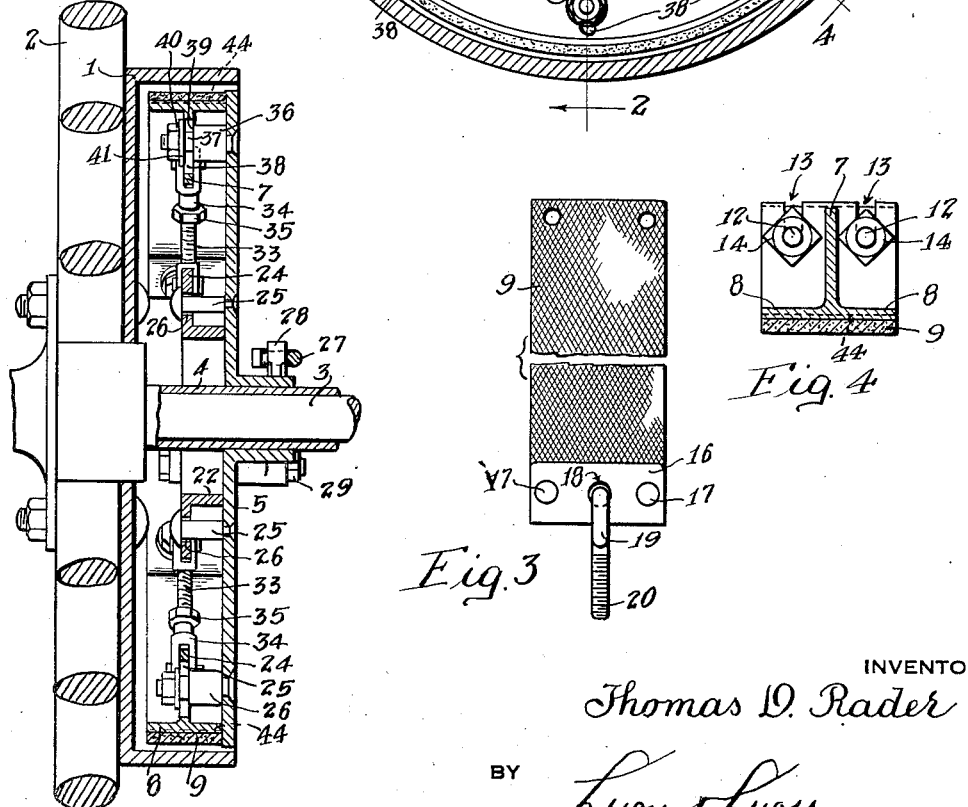
Fig. 2
Fig. 3
Fig. 4
INVENTOR.
Thomas D. Rader
BY Lyon+Lyon
ATTORNEYS Patented Feb. 8, 1938

UNITED STATES PATENT OFFICE 2,107,503

QUICK RELINING BRAKE

Thomas D. Rader, Glendale, Calif., assignor of one-half to Richard Macintosh, Los Angeles, Calif.

Original application November 13, 1934, Serial No. 752,823. Divided and this application June 1, 1936, Serial No. 82,728

3 Claims. (Cl. 188—234)

The present invention is a division of my prior application entitled "Brake" filed Nov. 13, 1934, Serial No. 752,823 which has become Patent 2,068,073 issued Jan. 19, 1937. The present invention relates to brakes, and while the invention is capable of being used in many different situations, in the present specification it is described as applied to the wheel of an automobile, or a trailer. Automobile brakes, when constructed of the "inside" type, usually involve the use of two oppositely disposed brake shoes that are pivotally mounted on the dust-plate on pivot points located near each other, and the brake shoes are expanded or forced outwardly by means of a pivoted double cam.

The relining of brake shoes in such a construction, is a tedious and expensive operation, and necessitates the removal of the brake shoes, and attaching the new lining by applying rivets throughout the length of the shoe.

Furthermore, when air brake shoes are pivotally mounted in the usual way it is not possible to reline them without removing them from the drum, and one of the reasons for this is that the pivotal connection for one end of the shoe is usually quite close to the drum flange.

One of the objects of this invention is to provide a brake construction having shoes which can very readily be relined; also to mount the brake shoes and their actuating means in such a way as to leave the ends of the brake shoes free and unobstructed, to facilitate the removal of worn brake linings without necessitating the removal of the brake shoes, and to facilitate their replacement with new linings, at the same time avoiding the necessity for applying any rivets on the face of the brake shoe.

Further objects of the invention will appear hereinafter.

The invention consists in the novel parts and combination of parts to be described hereinafter, all of which contribute to produce an efficient quick relining brake.

In the drawing:

Figure 1 is a vertical section through a brake drum and illustrating my brake mechanism with the actuating rod for the brakes broken away.

Figure 2 is a vertical section taken on the line 2—2 of Fig. 1, and also illustrating parts of the wheel and axle broken away.

Figure 3 is a developed plan of one of the brake linings removed from the brake, with its middle portion broken away. This view also shows an anchoring hook applied to the end of the brake lining.

Figure 4 is a cross section taken on the line 4—4 of Fig. 1, to illustrate the anchorage for the opposite end of the brake lining.

Referring more particularly to the parts, 1 indicates an automobile brake drum which may be part of a wheel 2. In the present instance, the wheel illustrated is supposed to be a rear wheel attached to an axle 3 mounted in an axle housing 4, to which a dust-plate 5 is rigidly secured. The dust-plate 5 is, of course, a relatively fixed frame member of the car.

In applying my invention to such a brake drum, I provide two oppositely disposed brake shoes 6, and these brake shoes are preferably identical in construction. They are preferably of arcuate form such as shown, to enable them to conform to the curvature of the inner face of the brake drum 1. Each shoe 6 is preferably formed with a relatively deep central web 7, and has oppositely disposed flanges 8, which form a rim for the shoe to which the brake lining 9 is applied. The brake lining is secured to each shoe so that it can be readily detached from it. For this purpose I prefer to provide the ends of each brake shoe with end flanges 10 and 11, which are preferably formed by bending the flanges 8 in a general radial direction, and inwardly toward the center of the wheel.

Any suitable means may be employed for detachably securing the ends of the brake lining. In order to accomplish this, I prefer to provide one end of the lining with a pair of bolts 12 (see Fig. 4), which may be shoved into slots 13 extending outwardly in the end flanges 11 of the brake shoes. These bolts are provided with nuts 14 respectively, for tightening them up, and under the nuts I prefer to employ spring washers 15. The other end of each brake lining is preferably provided with a pair of anchor plates 16, which are secured on opposite sides of the end of the lining by suitable rivets 17, and these plates 16 have a central opening 18, which can be applied to anchoring means preferably in the form of a hook bolt 19 located at the adjacent end of the shoe, and this hook bolt is secured in a tongue 10ª which constitutes an extension of the substantially radial end flange 10. The hook bolt 19 has a threaded shank 20 to pass through the tongue 10ª and receive a nut 21 for tightening it up.

In order to enable the brake lining to be detachable in this manner, it is necessary to employ means for actuating the brake shoes, which will leave their ends unobstructed. For this purpose I prefer to employ an actuator 22, which is preferably in the form of a substantially rectangular plate, the middle portion of which has a large opening 23 to enable the axle and axle housing 4 to pass through the same. Means is provided for guiding this actuator to slide to and fro on a diametrical line through the drum located midway between the two brake shoes 6. In the present instance, the brake shoes are located adjacent to the upper and lower sides of the drum, so that in the present instance, the direction of travel of the actuator 22 is horizontal. The actuator 22 is preferably of angular cross section, as illustrated in Fig. 2, so that it presents an outwardly projecting flange 24. The flange 24 is supported on a plurality of posts 25 in the form of stout pins that project inwardly from the dust-plate 5, and these posts or pins pass through horizontal slots 26 in the flanges 24, so as to guide the actuator plate 22 when it moves to and fro.

The slots 26 are slightly larger than the pins 25, so as to permit a slight lateral play in the actuator for a purpose which will appear hereinafter.

In applying the brake, tension exerted in the brake rod 27 actuates a lever 28 pivotally mounted on the outer side of the dust-plate, and this lever, through a rock shaft 29, operates an inner lever or arm 30 that is connected by a link 31 with the forward end of the actuator 22. By this means the actuator 22 can be pulled forwardly, and when it moves in this direction, force is applied to the brake shoes through a plurality of inclined thrust links 32, which incline in a forward direction toward their outer ends. The ends of these links are respectively, pivoted on the shoes and on the actuator, and these links are also preferably constructed so that they are adjustable. For this purpose each link preferably comprises a threaded stem 33 that is received in a threaded sleeve 34, and may carry a lock nut 35.

The dust-plate is provided with means for guiding the shoes 6 so that they will slide outwardly when the braking force is applied to them through the thrust links. For guiding the brake shoes outwardly, I prefer to provide the dust-plate with a plurality of guide posts 36, which have reduced necks 37 at their inner ends, which are received by parallel slots 38 formed in the brake shoe. These slots extend substantially at right angles to the direction of travel of the actuator 22. By reason of the reduced diameter of the necks 37, the outer ends of the posts form guide shoulders 39 for supporting and guiding the webs 7 of the shoes. The brake shoes are secured to the posts 36 by suitable nuts 40, which may be applied over suitable washers 41 (see Fig. 2).

After the brakes have been applied, they will be released by a return spring associated in some way with the mechanism. If desired, such return spring may be associated with the brake rod 27, but I prefer to employ a coil spring 42 located within the drum, attached at one end to an anchor pin 43 on the dust-plate, and attached at its other end to the adjacent end of the actuator (see Fig. 1).

By reason of the fact that the pins 25 and the slots 26 permit lateral play in the actuator, it will be evident that the thrust force developed in one set of links at one side of the actuator, will be imparted through the actuator plate to the opposite set of links. This balances and equalizes the pressure of the brakes against the drum, and also enables the pins 25 to be made relatively light, as their only work is to guide the actuator plate 22 until the braking force is applied. These features are covered in my prior application referred to above.

It will be evident that a brake mechanism constructed as described, will operate to apply the braking force with substantial uniformity throughout the area of the brake shoe, and furthermore, by reason of the fact that the brake shoes are positively guided in a general radial direction against the brake drum, there is no possibility for either of the shoes to become locked.

It will also be evident that when the brake linings have become worn, they can be quickly removed and new linings replaced, thereby resulting in great saving in time consumed in relining the brakes. In relining the brake shoes it will be evident that by permitting the brakes to assume their released position, the shoes will become removed from the inner face of the drum, whereupon it is merely necessary to release the hooks 19 and pull the worn lining off of the face of the shoe, after which the bolts 12 can be removed. The new brake lining is then attached at the bolts 12 and slid laterally into place on the face of the brake shoe. The other end of the lining is then attached to the hook bolts 19, and the nuts 21 tightened up to secure the lining in place. My means for actuating the shoes by shoving them bodily outward on a radial line, greatly facilitates the relining of the shoes in the manner described above, because the entire face of the brake shoe is removed considerably from the brake drum. It should be understood, however, that my mounting for the brake lining can be applied to a brake shoe that is pivotally supported, if the ends of the brake shoe are left accessible.

In order to prevent the tension developed in the brake linings from becoming concentrated at the anchorage at the ends of the brake shoes, I prefer to provide the outer face of each brake shoe with transverse grooves and ribs indicated by the dotted line 44 in Fig. 2.

It is understood that the embodiment of the invention described herein is only one of the many embodiments this invention may take, and I do not wish to be limited in the practice of the invention, nor in the claims, to the particular embodiment set forth.

What I claim is:

1. In an automobile brake having a brake-drum, a brake-shoe with means for mounting the same for outward movement against the drum, said means attached to the brake-shoe at intermediate points on the length of the shoe so as to leave the ends of the shoe clear and unobstructed, said brake-shoe having flanges at its ends, a detachable brake lining unattached to the shoe at intermediate points on its length, a bolt passing through one of the flanges for securing one end of the brake lining to the flange at one end of the shoe, a hook disposed in a substantially radial direction at the other end of the shoe and hooked into the adjacent end of the brake lining, said hook having a threaded shank passing through the adjacent flange of the brake-shoe with a nut seating on the flange for exerting tension on the lining to tighten the same on the shoe.

2. In a quick relining brake to be applied to the inside of a brake-drum, the combination of a shoe of arcuate form having substantially radial end faces, a brake lining extending along the outer periphery of the shoe unattached to the shoe at intermediate points on its length, means for securing one end of the lining at one of said radial faces, said brake shoe having a lug at its other end extending in a substantially circumferential direction, and a member mounted in said lug detachably engaging the adjacent end of the brake lining and having means for exerting tension in the brake to secure the same on the shoe.

3. In a quick relining brake to be applied to the inside of a brake-drum, the combination of a shoe of arcuate form having substantially radial end faces, a brake lining extending along the outer periphery of the shoe unattached to the shoe at intermediate points on its length, means for securing one end of the lining at one of said radial faces, said brake-shoe having a lug at its other end extending in a substantially circumferential direction, a bolt mounted in said lug and having a threaded shank, and a nut on the threaded shank seating against the said lug, said last named bolt having a hook detachably engaging the adjacent end of the said lining and operating to develop tension in the lining to secure the same to the brake shoe.

THOMAS D. RADER.